United States Patent [19]
Koob

[11] Patent Number: 5,398,986
[45] Date of Patent: Mar. 21, 1995

[54] MOBILE LASER SURGICAL CENTER

[75] Inventor: George F. Koob, St. Louis County, Mo.

[73] Assignee: Laser Vision Centers, Inc., St. Louis, Mo.

[21] Appl. No.: 103,598

[22] Filed: Aug. 9, 1993

[51] Int. Cl.⁶ .................................................. B60P 3/14
[52] U.S. Cl. ....................................... 296/24.1; 296/26
[58] Field of Search .................... 296/24.1, 26, 1.1; 248/637, 638, 649, 672, 678, 680

[56] References Cited
U.S. PATENT DOCUMENTS 4,181,347  1/1980  Clark ................................ 296/24.1 X
4,449,746  5/1984  Clark ................................ 296/24.1 X
4,712,822  12/1987  Janos et al. ........................ 296/24.1
4,915,435  4/1990  Levine .............................. 296/24.1

Primary Examiner—Joseph Pape
Attorney, Agent, or Firm—Polster, Lieder, Woodruff & Lucchesi

[57] ABSTRACT

A mobile laser surgical center includes a truck body in which the surgical center is housed and a truck cab which transports the surgical center from one location to another. The surgical center includes a laser, a control for the laser and a patient seat. The truck body includes a floor, side walls, and a top. The laser is secured to the floor such that substantially no realignment of the laser is needed when the center is transported between locations. The truck body is also stabilized so that the truck body floor will be maintained in a level condition during a surgical procedure.

16 Claims, 4 Drawing Sheets

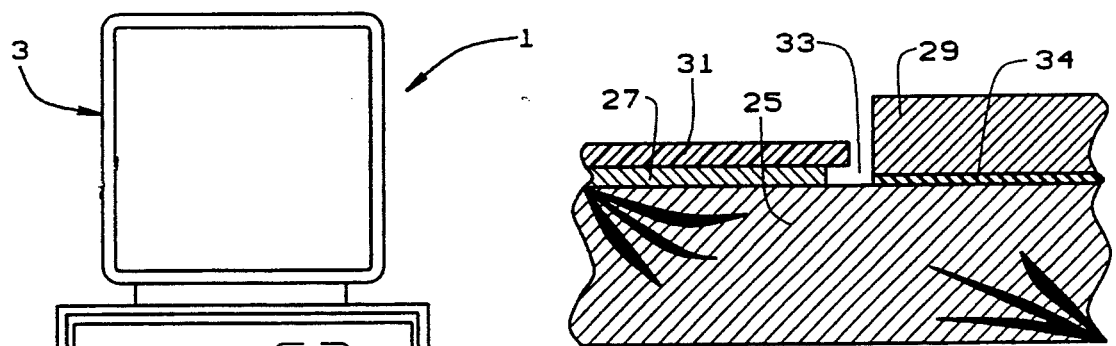
FIG. 3
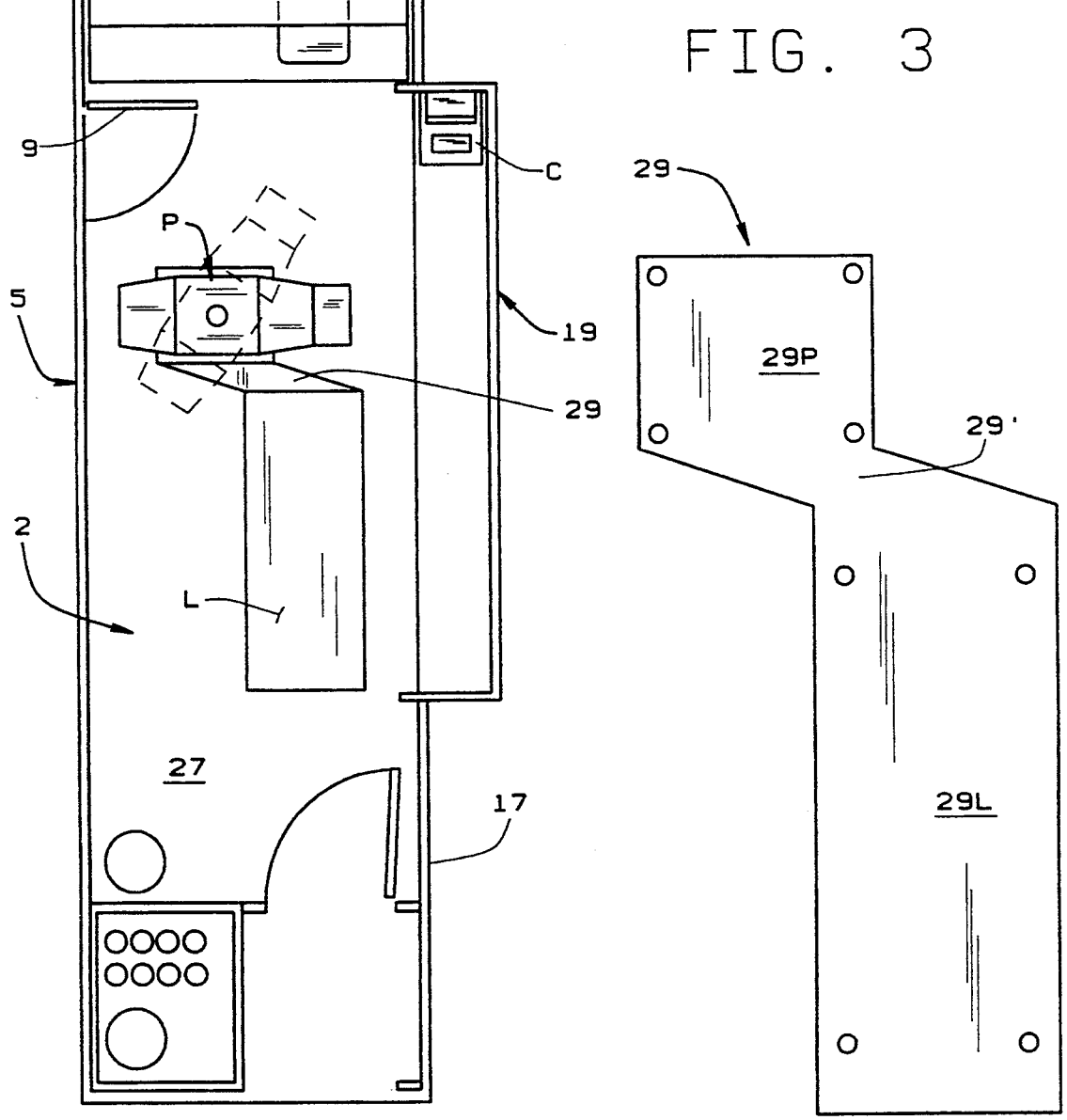
FIG. 4
FIG. 5

MOBILE LASER SURGICAL CENTER

BACKGROUND OF THE INVENTION

This invention relates to laser surgery centers, and in particular, to mobile laser surgery centers.

Surgical procedures to correct vision conditions such as nearsightedness have typically been performed in hospital settings or doctors' offices with large pieces of equipment. Lasers have recently been adapted for use in refractive surgery to correct such eye conditions. Laser surgery overcomes many of the problems associated with the prior surgical devices. Particularly, lasers are relatively small and can thus be transported and made mobile.

Mobile lasers are mounted in trucks or semi-trailers, which have been converted to an office setting. For the laser to operate properly, the laser optics must be properly aligned. Because the roads over which the center is transported are not perfectly smooth, the laser will be jostled during transport from one location to another. The laser will therefore come out of alignment. It must thus be realigned each time the mobile surgical center is transported to a new location. An alignment procedure can take up to six hours to perform. There is no presently commercially available system known which will prevent the laser from coming out of alignment. Further, because eye surgery requires exacting control over the laser that is used to conduct the surgery, the optics of the laser are highly susceptible to vibration during a procedure. Small vibrations transmitted to the optics may move the laser beam to an undesirable location. The floor of the truck or trailer transmits vibrations which may be caused simply by the movement of someone in the trailer. The laser must therefore be isolated from vibrations.

SUMMARY OF THE INVENTION

One object of his invention is to provide a mobile laser surgical center.

Another object is to provide such a surgical center in which the laser need not be realigned each time the surgical center is moved.

A third object is to provide such a surgical center in which the laser is vibrationally isolated.

These and other objects will become apparent to those skilled in the art in light of the following description and accompanying drawings.

In accordance with the invention, briefly stated, a mobile laser surgical center includes a truck or a trailer in which the surgical center is housed and a trailer cab which transports the surgical center from one location to another. The surgical center includes a laser, a control for the laser and a patient seat. The laser is secured to the floor such that substantially no realignment of the laser is needed when the center is transported between locations. The trailer is also stabilized so that it will remain level during an operating procedure.

The laser includes a laser frame having top, bottom, and side frame members. The bottom frame members are secured to a mounting plate, preferably a one-half inch thick steel plate. Both the laser and the patient chair are secured to the mounting plate. The laser sits on spacers. Fasteners extend through the bottom frame members, the spacers, and at least partially into the mounting plate to mount the laser to the mounting plate. The mounting plate is on a sub-floor made of a plywood sheet and a cushioning layer. The sub-floor in turn rests on cross-members which span the width of the trailer above the trailer's frame rails. Fasteners extend through the mounting plate, sub-floor and the cross-members to securely fasten the mounting plate to the trailer. This system of fastening the laser to a heavy mounting plate, which in turn is securely fastened to the truck floor, prevents the laser frame from being distorted during transport of the center, substantially reducing the need for realignment of the laser optics. To further ensure that the laser will not come out of alignment, the laser frame is reinforced with diagonal cross-beams at the front of the frame and triangular gussets along the side corners of the frame.

Because the operating procedure is susceptible to vibrations in the floor, the laser is vibrationally isolated from the rest of the truck or trailer floor. The mounting plate is coextensive with the laser frame around the laser's side and back and includes a forward portion to which the patient chair is secured. The remainder of the truck or trailer floor is covered by a plate which is spaced from the mounting plate. This space and cushioning layer under the mounting plate vibrationally isolates the laser from the rest of the floor.

The truck or trailer is stabilized by the use of stabilizers which level the truck or trailer during a surgical procedure. To ensure that the truck or trailer is not swayed by the wind, guy wires are supplied which extend between the truck or trailer and the ground. Further, to ensure that the trucks suspension system does not affect the leveling of the truck by the stabilizers, the suspension system is connected to the trucks ignition. Thus the suspension system is deactivated when the truck is not operating.

BRIEF DESCRIPTION OF THE DRAWINGS

In the drawings.

FIG. 3 is a fragmentary sectional view of the floor of the truck;

FIG. 4 is a plan view of the interior of the truck;

FIG. 5 is a plan view of a laser mounting plate of the truck;

DESCRIPTION OF THE PREFERRED EMBODIMENT

Figure 1:
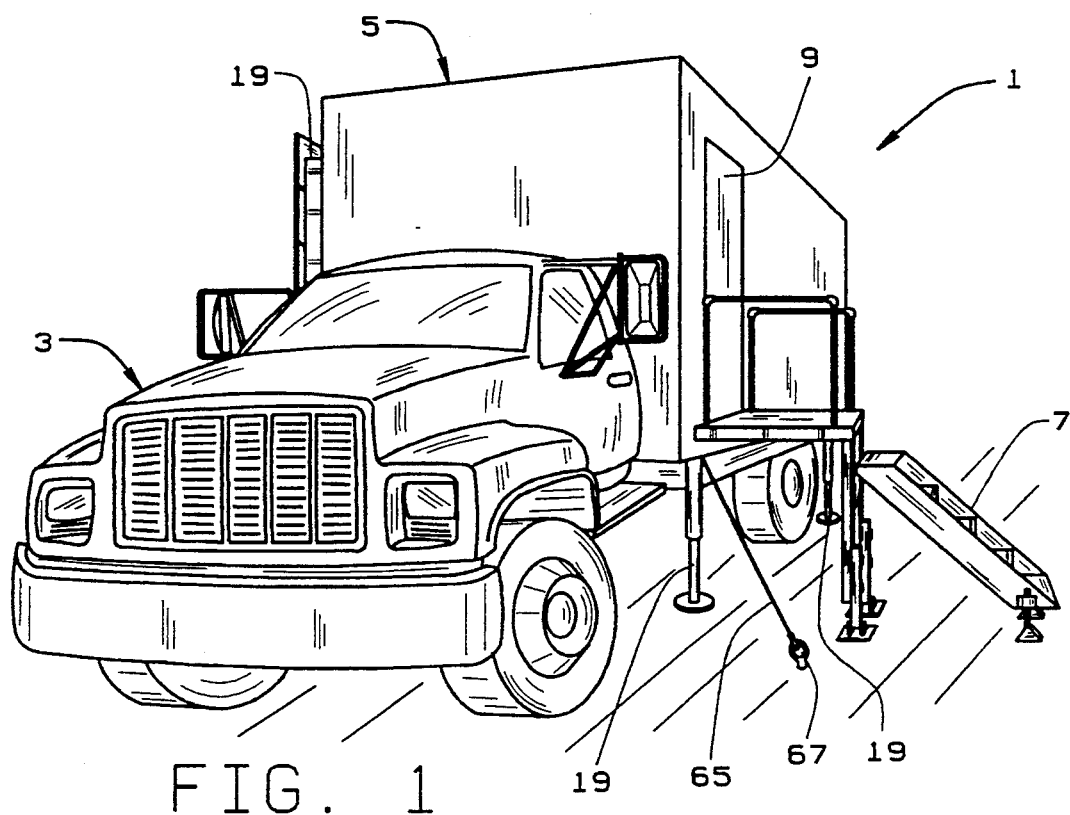
FIG. 1 is a perspective view of a mobile surgical laser center of the present invention.

A truck 1 is shown in FIG. 1 which contains a mobile laser surgical center 2 of the present invention. Truck 1 includes a cab 3 and a body 5. In some cases, the truck and truck body may be a tractor and trailer combination. The surgical center 2 is located in the body 5, as shown in FIG. 4. Stairs 7 and a door 9 are provided so that patients may enter and exit the center 2 with ease.

Turning to FIG. 4, center 2 includes a laser L, a patient seat P, and a computer C used to control the laser L. A patient's eyesight is corrected by shaping the patient's lens with the laser. For the laser to operate properly, it must be aligned, level, and isolated from vibrations which may be carried through the floor of the trailer. The manner in which the laser is mounted to the truck and the operation of the truck substantially eliminates the need to realign the laser after the center has been moved from one location to another. This structure thus substantially eliminates what can be a six hour alignment procedure. Further, the construction of the truck body's flooring insulates the laser from any vibration which may be caused by movement within the truck by operating personnel.

Figure 2:
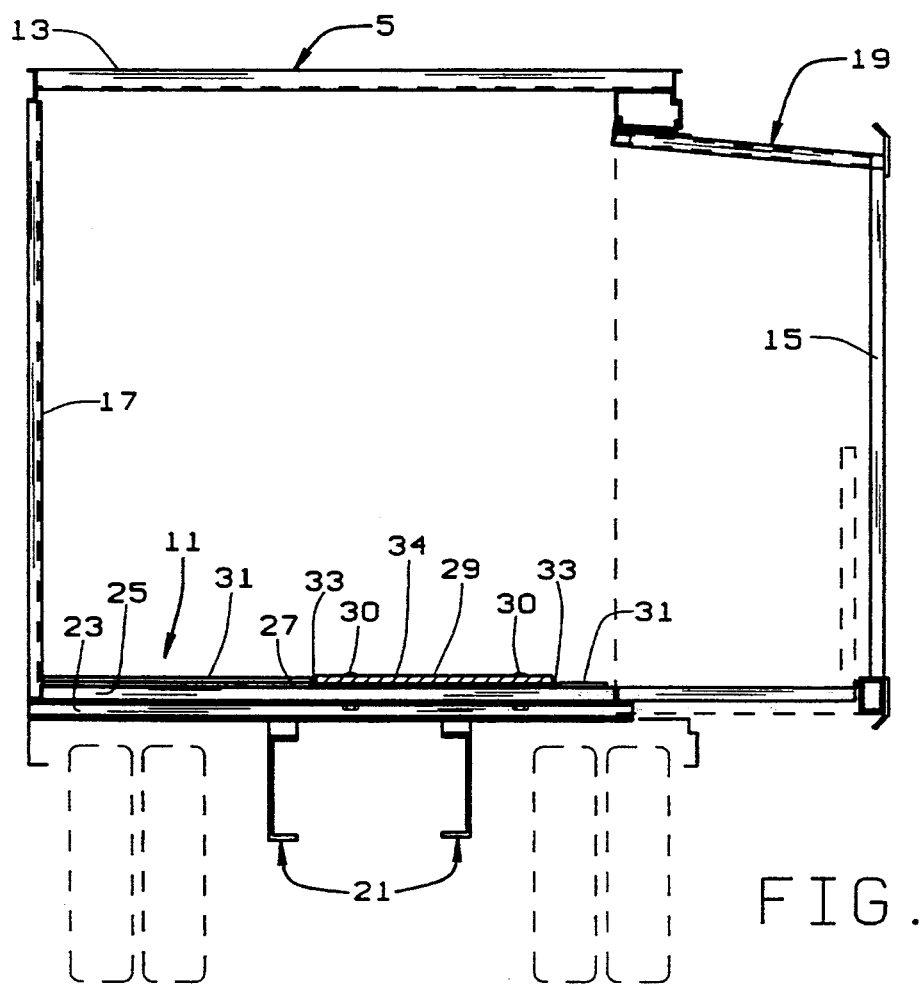
FIG. 2 is a cross-sectional view of a truck of the mobile laser surgical center.

As shown in FIG. 2, the truck body 5 includes a floor 11, a top 13, a first side wall 15, and a second side wall 17. Side wall 15 includes a section 19 which is extendable and retractable. In FIG. 3, expanded section 19 provides extra space in truck body 5 in which the operator may control the computer C to perform the laser surgery.

Truck body 5 is shown in FIG. 2 as including frame rails 21 which extend substantially the full length of body 5 and a plurality of cross-members 23 which extend substantially the full width of trailer 5. Cross-members 23 are preferably 3×3 I-beams. Cross-members 23 extend substantially perpendicular to rails 21 and are spaced along rails 21 to support floor 11. Floor 11 includes a sub-floor 25 which is placed over members 23. Sub-floor 25 is preferably made from one-inch thick plywood. A one-eighth inch steel plate 27 lays on the sub-floor. Plate 27 is a steel sheet, preferably a one-eighth inch flat sheet. Sub-floor 25 and plate 27 are coextensive with floor 11.

A mounting plate 29, preferably a one-half inch thick steel mounting plate, is placed on rubber sheet 34. Rubber sheet 34 is a cushioning layer which lays over the sub-floor 25, preferably a one-sixteenth corrugated rubber sheet. Plate 29 does not cover the full trailer floor space. Rather, it is shaped and sized to mount only the laser L and the patient chair P. As can be seen in FIG. 5, plate 29 has a laser mounting section 29L and a patient chair mounting section 29P which are connected by an area 29'. Mounting plate 29 is secured to the floor by bolts 30 which extend through the rubber sheet 34 and the sub-floor 25 to be secured to the cross-members 23. The remainder of the floor space is covered with top-floor 31. Top floor 31 is a flooring such as vinyl flooring, which is aesthetically pleasing and preferably easy to install and maintain, is placed over the steel plate 31. The vinyl flooring is flush with the mounting plate 29 to cover gap 33. Steel plate 27 is spaced from mounting plate 29 by a gap 33. This gap vibrationally isolates laser L from the rest of floor 11 and prevents vibrations, such as may be caused by personnel walking on the floor, from affecting the laser surgery operation.

Figure 6:
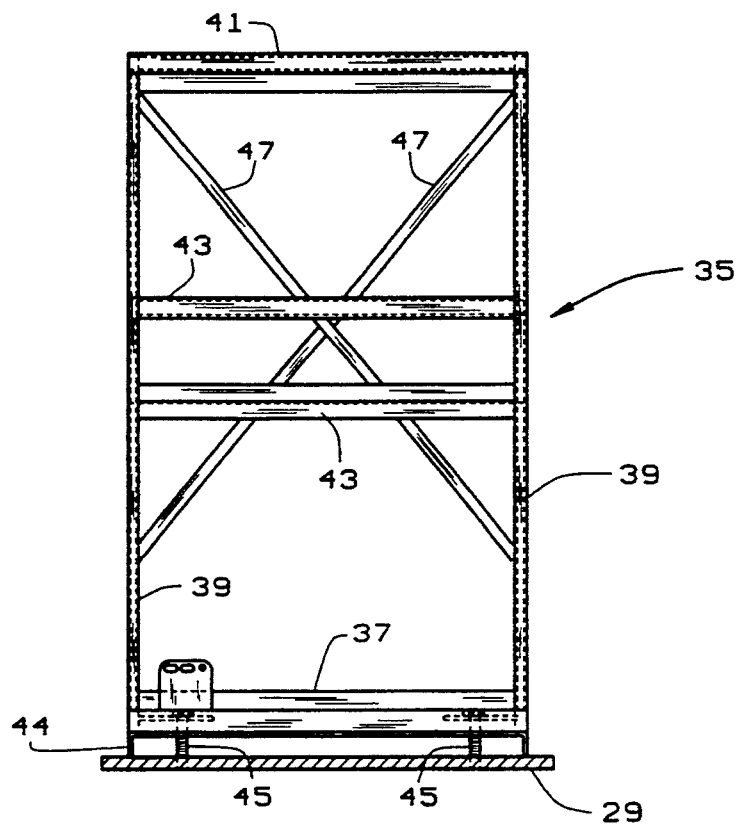
FIG. 6 is a front elevational view of a frame of the laser.
Figure 7:
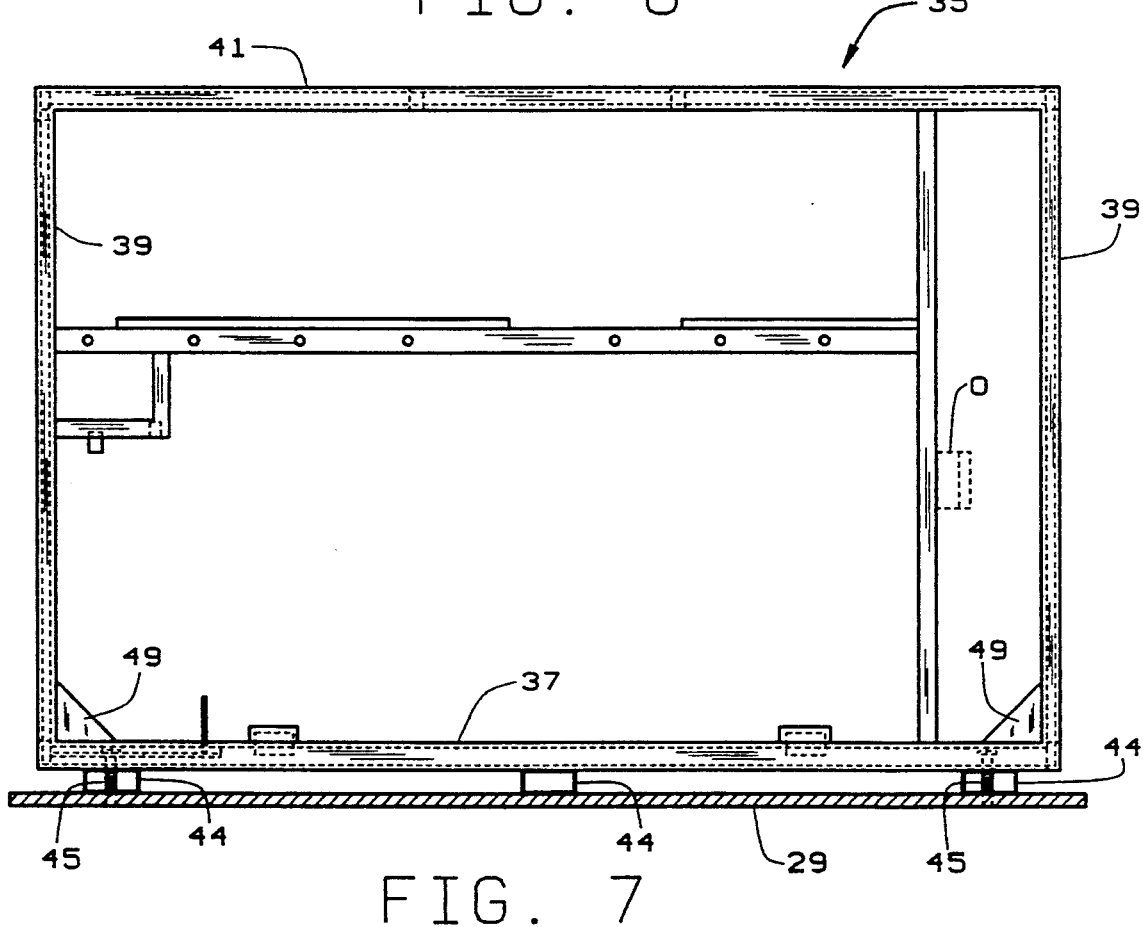
FIG. 7 is a side elevational view of the laser frame.

Turning to FIGS. 4 and 6–7, the laser L includes a frame 35 which carries the optics O from which the laser beam is emitted. The optics are secured to the frame to prevent movement of the optics relative to the frame. Frame 35 includes bottom frame members 37, side frame members 39, and top frame members 41. Generally horizontal members 43 extend between the front side frame members. (FIG. 6). Frame 35 rests on a plurality of spacers 44 which extend the width of frame 35. Spacers 44 are preferably 2×4 steel tubes which elevate the frame a predetermined amount, preferably about two inches. The frame is secured to the spacers 44 by bolts 45 which extend through the leg mounting plates of frame 35 through spacers 44 and into mounting plate 29. The use of the mounting plate 29 to mount the laser L to floor 11 substantially stabilizes and immobilizes laser L, preventing or distortion of the laser frame which may bring it out of alignment.

To further ensure that the top members 41 and side members 39 of frame 35 do not change position relative to bottom members 37, cross-beams 47 extend diagonally between the front side frame members 39. Diagonal cross-members 47 prevent side-to-side swaying or movement of the frame. Gussets 49 are added at the lower corners to help stabilize the frame 35 with respect to front-to-back swaying or movement. Gussets 49 (FIG. 7) are made of triangular plates which are secured to the side members 39 and the elongate bottom members 37 so that they face forward and backward. Gussets 49 preferably have an outer edge or hypotenuse of about six inches. The use of the cross-members 47 and gussets 49, in combination with the securement of the laser L to a sturdy mounting plate 29, substantially prevents movement or jostling of the laser L during transport of center 2 which would bring laser L out of alignment. As can be appreciated, this saves a significant amount of setup time at each new location.

Figure 9:
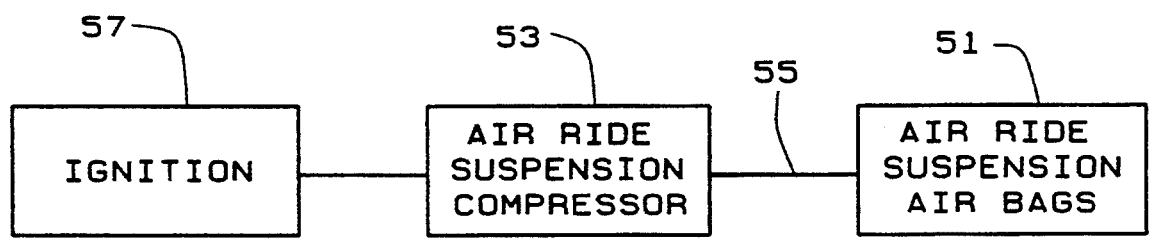
FIG. 9 is a schematic of the suspension system of the truck.

Turning to the block diagram of FIG. 9, the truck includes a suspension mechanism to make the ride more comfortable. The suspension is preferably an air ride suspension having air bags or bladders 51 (FIG. 9) which are connected to a compressor 53 over an air line 55. If the compressor is operable when the center 2 is being used, various changes in the ambient environment may cause the compressor to operate to inflate or deflate the bladders, thereby causing movement of the truck body which may adversely affect a laser operation. To prevent the suspension system (i.e. the compressor 53) from operating when the center 2 is at an operating location, the compressor is operatively connected to the truck's ignition 57. Thus, when the ignition is turned off, the compressor will be inoperative and the suspension system will be inactive and incapable of affecting the laser surgery.

Figure 8:
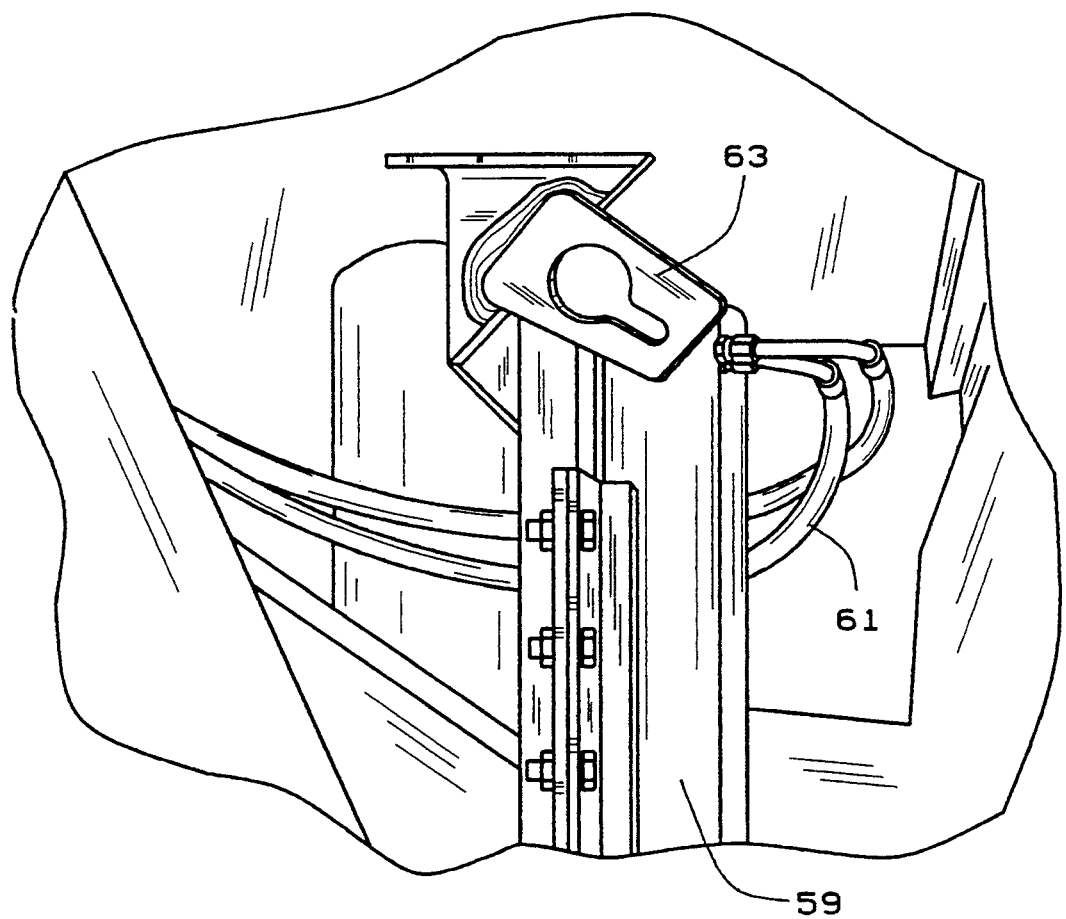
FIG. 8 is a perspective view of a stabilizing strut of the truck.

The laser needs a level plane on which to operate. Thus, the truck body floor must be level when the laser is operated. Stabilizers 59 are provided at the front corners and behind the truck's wheels to level the truck body. The stabilizers are preferably hydraulically operated stabilizers which are connected to the truck's hydraulic system over hydraulic lines 61 (FIG. 8). Because the sides of the trailer present a large sail to wind, the truck is provided with tabs 63 secured to the underside of the trailer adjacent the stabilizers 59. Chains 65 (FIG. 1) may be connected at one end to the tabs 63 and at another end through eyes 67 on the ground. The chains 65 will act as guy wires to prevent the truck body from swaying in the wind. Only one chain 65 is shown in FIG. 1. However, preferably 4 chains 65 are provided—one for each corner of the truck body 5.

Connecting the suspension compressor 53 to the ignition and providing the tabs 63 for guy wires 65 substantially prevent external forces from affecting the laser surgery. The construction of the truck body floor and the manner of mounting the laser to the floor prevents the laser from requiring constant aligning and insulates the laser from the vibrations.

Variations, within the scope of the appended claims, may be apparent to those skilled in the art. For example, different mounting systems could be employed which substantially and permanently fix the position of the laser. Different materials may be used to prevent vibrations from affecting the surgical operation. These variations are merely illustrative.

I claim:

1. A mobile laser surgical center including a truck body in which the surgical center is housed and a truck cab which transports the surgical center from one location to another;
  the surgical center including a laser, a control for said laser and a patient seat;
  said truck body including a floor, side walls and a top, the surgical center being secured to a mounting plate generally conforming in shape to the surgical center that is secured to a part of said floor independent of the remainder of said floor such that substantially no realignment of the laser is needed as the result of use or transport of the surgical center.

2. The surgical center of claim 1 wherein the laser includes a laser frame having top, bottom, and side frame members, said bottom frame members being secured to a mounting plate.

3. The surgical center of claim 2 wherein said mounting plate is a steel plate which is approximately one-half inch thick.

4. The surgical center of claim 2 wherein said mounting plate is secured to a part of said floor in spaced relationship to the remainder of said floor.

5. The surgical center of claim 2 wherein said laser sits on spacers; said laser being secured to said frame by fasteners which extend through said bottom frame members, said spacers, and at least into said mounting plate.

6. The surgical center of claim 5 wherein said spacers are elongate members which extend substantially the full width of said frame, at least one such spacer being positioned at a front of said frame and one such spacer at a back of said frame.

7. The surgical center of claim 2 wherein said frame includes cross-members which extend diagonally between said side members of said frame.

8. The surgical center of claim 2 wherein said frame includes gussets interconnected between said side frame members and said bottom frame members.

9. The surgical center of claim 8 wherein said gussets are substantially triangular in shape and are mounted to said frame in substantially parallel relationship to the longitudinal axis of said frame.

10. The surgical center of claim 2 wherein said truck body includes frame rails extending longitudinally of said truck body and cross-members placed above said truck body frame rails to extend the width of said truck body; said mounting plate being secured to a sub-floor positioned on said truck body cross-members.

11. The surgical center of claim 10 wherein said sub-floor includes a flooring member defining said floor.

12. The surgical center of claim 11 wherein the sub-floor includes a pliable sheet positioned on said floor member.

13. The surgical center of claim 12 wherein said pliable sheet is a rubber sheet.

14. The surgical center of claim 13 wherein said rubber sheet is corrugated.

15. The surgical center of claim 10 wherein said floor include a top floor on said sub-floor, said top floor surrounding said mounting plate.

16. The surgical center of claim 15 wherein said top floor is spaced from said mounting plate.

* * * * *